US012521763B1

(12) United States Patent
Ebadian et al.

(10) Patent No.: US 12,521,763 B1
(45) Date of Patent: Jan. 13, 2026

(54) SHREDDER CENTRIFUGAL SEPARATOR

(71) Applicant: Phiston Technologies, Inc., Miramar, FL (US)

(72) Inventors: M. Ali Ebadian, Miramar, FL (US); Raul Travieso, Miramar, FL (US); Alejandro Paya, Miramar, FL (US)

(73) Assignee: Phiston Technologies, Inc., Miramar, FL (US)

( * ) Notice: Subject to any disclaimer, the term of this patent is extended or adjusted under 35 U.S.C. 154(b) by 0 days.

(21) Appl. No.: 19/359,943

(22) Filed: Oct. 16, 2025

(51) Int. Cl.
*B07B 7/086* (2006.01)
*B02C 23/20* (2006.01)

(52) U.S. Cl.
CPC .............. *B07B 7/086* (2013.01); *B02C 23/20* (2013.01)

(58) Field of Classification Search
CPC ............ B07B 7/086; B02C 23/20; B04C 3/06
See application file for complete search history.

(56) References Cited

U.S. PATENT DOCUMENTS 3,981,454 A * 9/1976 Williams ................ B02C 23/20
241/DIG. 38

FOREIGN PATENT DOCUMENTS

CN 117483081 A * 2/2024 ............. B02C 23/20
KR 102880278 B1 * 11/2025 ........... B29C 48/911
WO WO-2019058388 A1 * 3/2019 ............. B04C 5/185

* cited by examiner

*Primary Examiner* — Jacob S. Scott
*Assistant Examiner* — Miraj T. Patel
(74) *Attorney, Agent, or Firm* — McHale & Slavin, P.A.

(57) ABSTRACT

A centrifugal separator system separates particulate matter from an air stream produced by an industrial shredding machine. The system includes a housing having a cylindrical conical shape defining an interior chamber. An inlet positioned tangentially near the top of the housing introduces an air and particle mixture to create a vortex flow that centrifugally displaces heavier particles where they slide downward to discharge aperture. Clean air reverses direction and exits upward through a central top outlet connected to a HEPA filter for removing residual dust. A first silo directs is used to decelerate separated particles which are directed through a rotary valve providing an airlock to maintain pressures for optimizing centrifugal separation of particles. A second silo receives a bag holder for ease of securing a collection bag. The system provides efficient separation of particles with minimal maintenance and allows continuous operation.

6 Claims, 4 Drawing Sheets

SHREDDER CENTRIFUGAL SEPARATOR

FIELD OF THE INVENTION

This invention is related to the field of data destruction and, in particular, to a separation system using a vortex flow to separate particulate matter from an air stream generated by an industrial shredding machine.

BACKGROUND OF THE INVENTION

Electronic data is commonly stored on solid state drives (SSD's) with or without caddies, M.2 drives, PCIe cards (peripheral component interconnect express), magnetic tapes, and the like devices that demand micro particle destruction. Tape media is an example of a difficult to shred material as tape can stretch and is known to jam conventional shredding machined.

It is critical that the electronic data stored on the devices is properly discarded or otherwise made unrecoverable. The release of sensitive data placed on the storage devices can be catastrophic. Loss of date can result in trade secret theft and loss of a business advantage over a competitor. Loss of sensitive data can result in identity theft, and the resulting harm can be irreparable. Data storage devices can be changed due to lack of capacity or speed, mechanical malfunction, or simply due to a computer hardware/software upgrade. It is not always practical to separate the data storage device from the underlying supporting components. While equipment exists for the proper shredding of material, the amount of waste produced can quickly fill up a catch bin which is typically placed at a position to accept the shredder material. The waste in many instances is less than 2 mm×2 mm in size wherein a transfer bin can accept a large amount of shredded waste. Shredding of the finer material, such as Linear Tape-Open (LTO) which is known to hold up to 18 terabytes of data on a single tape.

Various data destroying devices are described in prior patents including U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid State Drive Disintegrator; U.S. Pat. No. 10,242,699 for a Single Pulse Degaussing Device; U.S. Pat. No. 10,657,345 for a Media Destruction Verification Apparatus; U.S. Pat. No. 11,400,457 for a Solid State Drive Media Destroyer; U.S. Pat. No. 11,267,647 for a Security Bin; and U.S. Pat. No. 11,389,805 for a Method and Apparatus for HDD and Electronic Waste Disposal.

These industrial shredding machines generate a continuous stream of shredded particulate matter, including small plastic, metal, paper or tape fragments. These particles can pose environmental and operational challenges if not properly separated and collected. Traditional dust collection systems often rely on filters alone, which quickly clog and require frequent maintenance. Centrifugal separators are used to separate heavier particles without the need for moving parts. However, adaptation for use with data destroying device is not known.

The present invention provides a centrifugal separator system that improves separation efficiency and containment of data destroying devices, especially when tape is involved, through the integration of a collection assembly with a releasable collection bag.

SUMMARY OF THE INVENTION

A centrifugal separator system for use in combination with a data destroying device, commonly referred to as a shredder. The separator is formed from a housing having a cylindrical sidewall with a top wall and a bottom discharge aperture. The cylindrical sidewall having a conical shape with the discharge aperture having a diameter less than the diameter of the top wall, the sidewall and top wall forming an interior chamber. An inlet positioned adjacent to the top wall and tangential to the sidewall. The inlet carrying shredded particles from an industrial shredding machine which is transferred using a continuous flow of air. The air stream carrying particulates enters the separator housing causing the air/particle mixture to spin rapidly forming a vortex inside the separator interior chamber. The air spirals downward along the cyclone chamber wall in a tight spiral pattern to create a centrifugal force, essentially "throwing" heavier particles toward the outer wall due to inertia. Particle size 2 mm×2 mm or less are separated from the air/particle mixture. As the particles impact the chamber sidewall, they lose velocity and slide downward toward the discharge aperture.

As the particles are separated from the air stream, the air stream reverses direction at the discharge aperture and spirals upward through a center vortex in line with a centrally positioned outlet. The air leaving through the top outlet is significantly cleaner wherein most particles larger than a few microns have been removed leaving dust or microscopic particles which are directed through and captured by an in-line HEPA filter.

An upper edge of a first silo is coupled to the bottom of the cyclone separator. The first silo is constructed and arranged to decelerate particles from the centrifugal acceleration created in the interior chamber allowing the particles to move downward. The lower edge of the first silo is coupled to a rotary valve that acts as an airlock between zones with different pressure levels as well as operates as a shut off. The rotary valve is positioned for optimum air flow allowing decelerated particles to pass, or pause the air flow if no particles are to pass.

A second silo is coupled to the bottom of the rotary valve having protrusions on an outer surface constructed to interface with a bag holder. A bag being releasably secured to the bag holder.

An objective of the invention is to provide fine particle separation and minimize HEPA filter replacement.

Another objective is to provide a device for particle separator without internal moving parts, efficient multi-stage particle collection and easy disposal through a reusable bag.

Still another objective of the invention is to provide continuous particle separation and temporary equipment isolation using a rotary valve.

Another objective is to provide high separation efficiency by removing particles larger than approximately 5 microns before filtration, reducing energy consumption and extending HEPA filter lifespan.

The centrifugal separator system of the instant invention provides an efficient, modular, and serviceable design suitable for integration with a variety of industrial shredding systems. A quick-release bag holder, rotary valve, and dual silo configuration facilitate continuous operation with minimal maintenance downtime.

Other objectives and advantages of this invention will become apparent from the following description taken in conjunction with any accompanying drawings wherein are set forth, by way of illustration and example, certain embodiments of this invention.

DETAILED DESCRIPTION OF THE INVENTION

Figure 1:
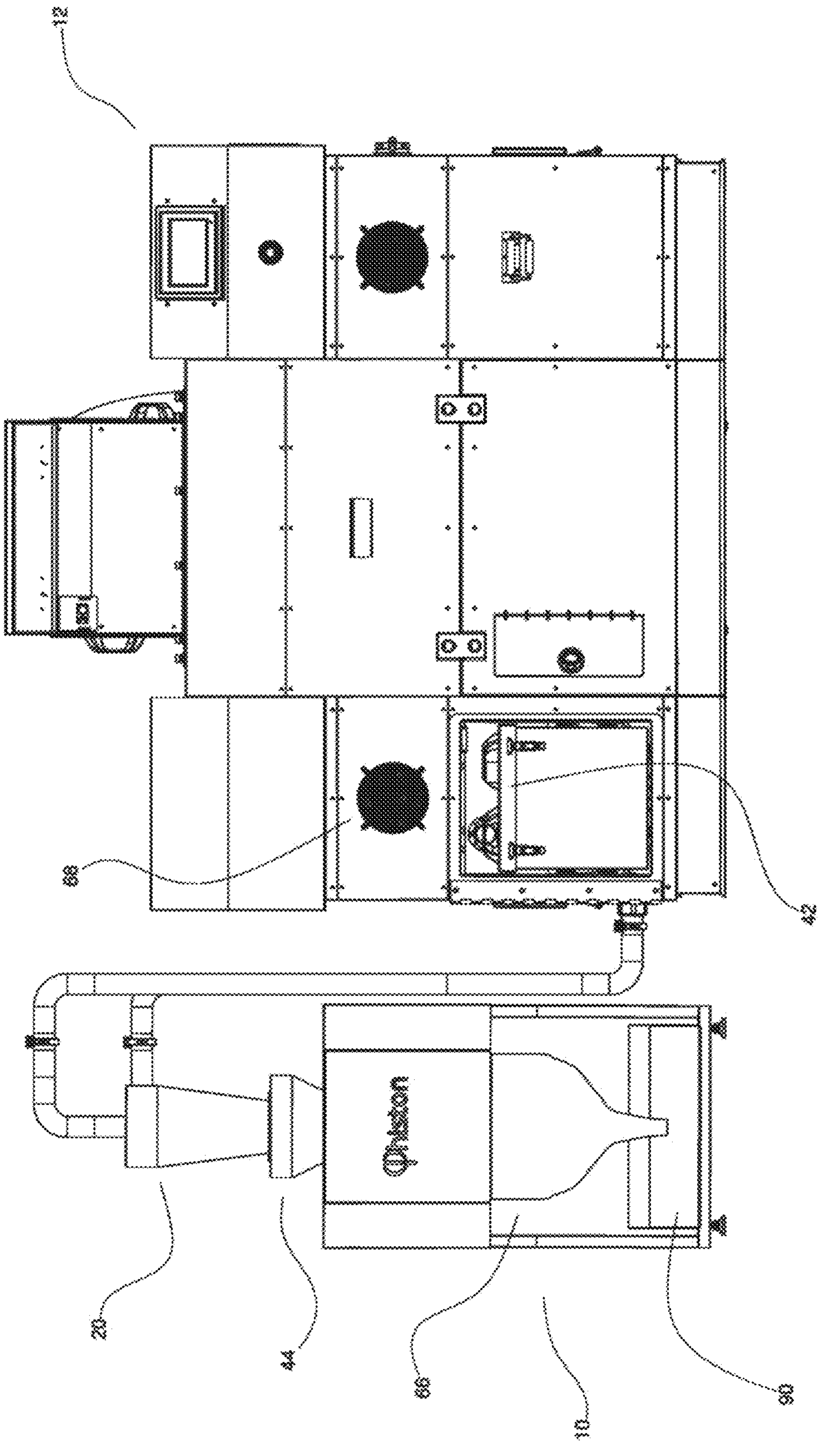
FIG. 1 is a pictorial view of the centrifugal separator coupled to an industrial shredder.

While the present invention is susceptible to embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring now to Figures, a centrifugal separator system (10) is illustrated for separating particulate matter received from an adjoining industrial shredding machine (12) through an air stream (14). The centrifugal separator system (10) is designed to remove particles of varying size and density from the air stream, allowing efficient collection and filtration of particulate matter generated during shredding operations. This has a particular advantage with shredders are used to destroy tape. The separator system (10) employs a housing (20) defined by a cylindrical sidewall (22) surrounding an interior chamber (24). The interior chamber (24) has a conical lower section (26) that decreases in diameter from a top wall (28) to a bottom aperture (30). The housing (20) provides the structural enclosure within which centrifugal separation occurs.

A chamber inlet (32) is positioned tangentially relative to the sidewall (22) and adjacent the top wall (28). The chamber inlet (32) is constructed and arranged to introduce the air stream (14) from a blower (68) mounted in the industrial shredding machine (12). The air stream (14) carries airborne debris created during the shredding procedure into the chamber (24) in a tangential direction, thereby generating a vortex flow (34) within the chamber (24). The vortex flow (34) produces a centrifugal force that acts on the entrained particles, separating heavier particulate matter radially outward toward the inner surface of the sidewall (22), while finer dust particles remain airborne and are drawn toward the chamber centerline.

The heavier particles (36) drop downward along the sidewall (22) under gravity and exit the chamber (24) through a discharge aperture (38) located at the lower end of the housing (20). A top outlet (40) is centrally positioned within the top wall (28) for discharge of air substantially free of particles larger than a few microns. The outlet (40) is connected to a HEPA filter assembly (42) positioned on the shredder (12) to remove remaining fine dust particles before the air is discharged to the atmosphere.

Figure 2:
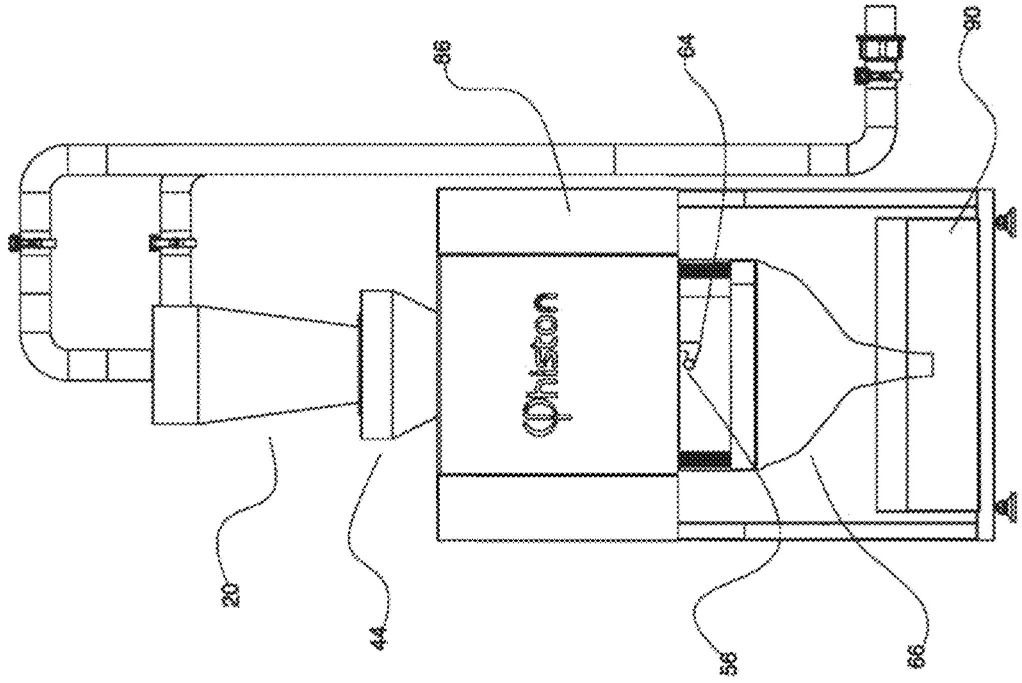
FIG. 2 is a front plane view of the centrifugal separator.
Figure 4:
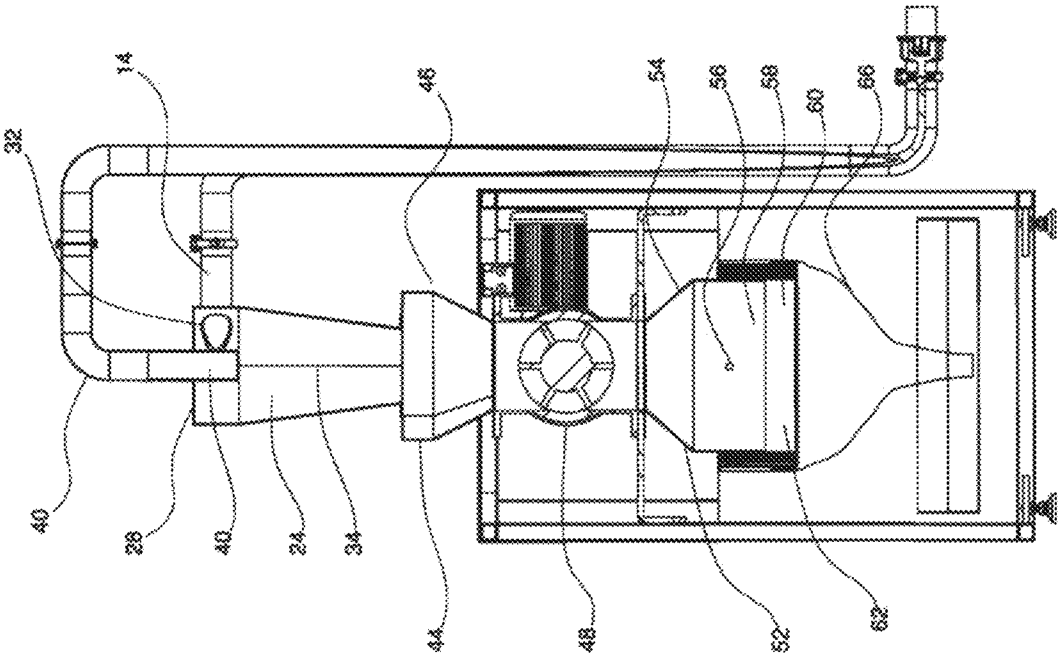
FIG. 4 is a cross sectional view of FIG. 3.
Figure 3:
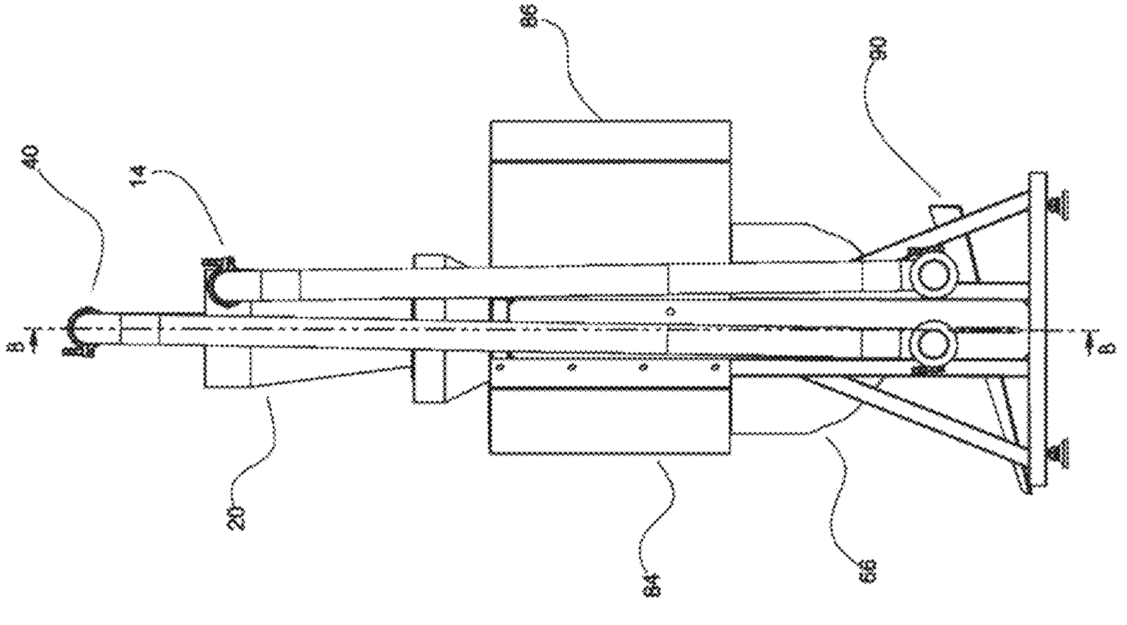
FIG. 3 is a right side view thereof.
Figure 5:
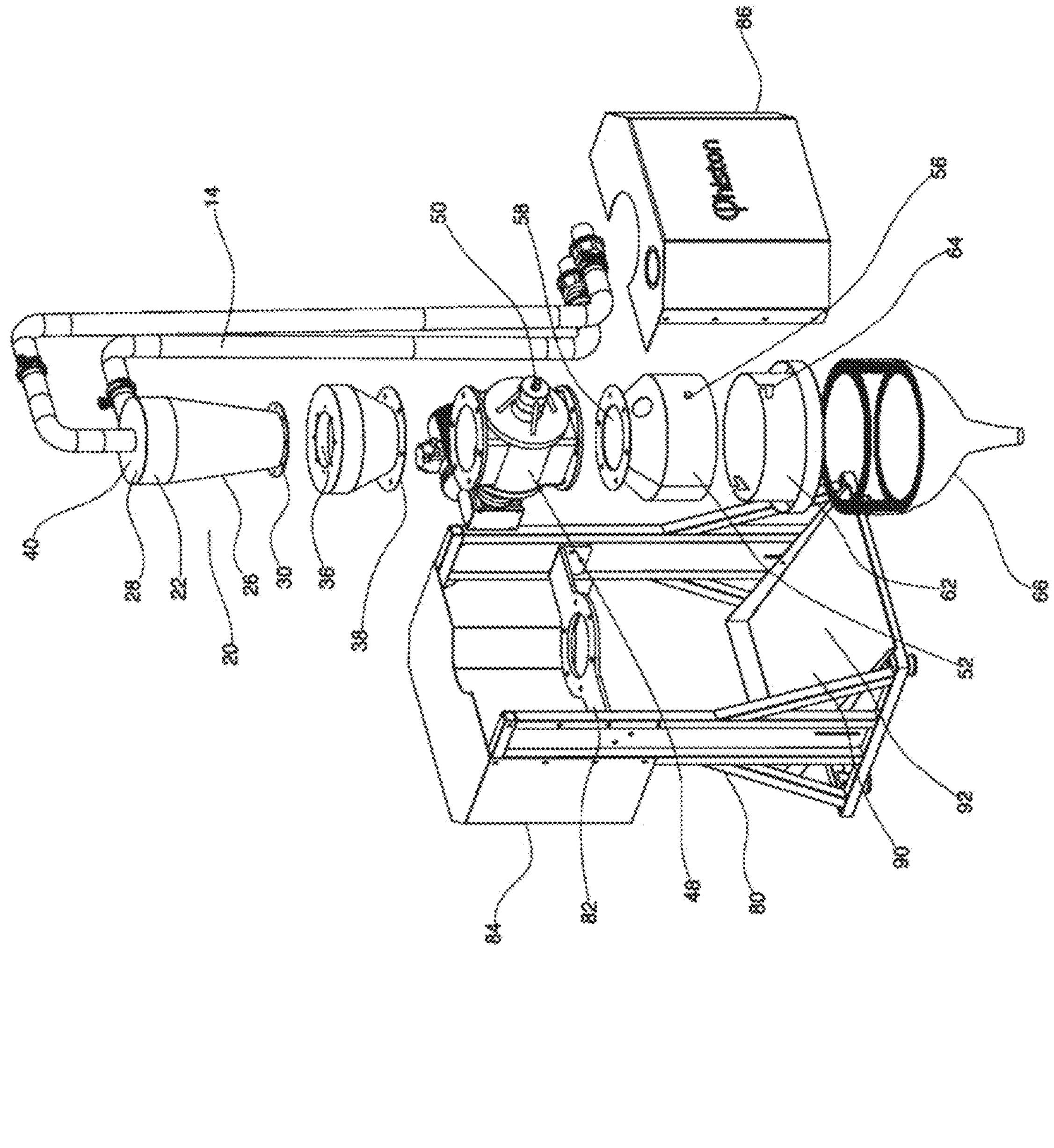
FIG. 5 is an exploded view of the centrifugal separator.

Coupled to the lower edge of the housing (20) is a first silo (44) as shown in FIGS. 2, 5, and 6. The first silo (44) is formed with a conical lower section (46) that serves to decelerate the separated particles (36) expelled through the discharge outlet (38) while directing them toward a rotary valve (48). The conical configuration (46) minimizes air turbulence within the silo and ensures a smooth, continuous flow of material toward the valve (48).

The valve (48) is coupled to the outlet of the first silo (44) and functions as an airlock between the separator's interior (24) and downstream collection zones operating at different pressure levels. The valve (48) includes a rotating vaned rotor (50) that can be rotated to prevent air backflow into the separator housing (20). The system is dimensioned such that the air velocity and centrifugal force are sufficient to remove at least 90% of particles larger than 5 microns prior to discharge through the top outlet pipe.

A second silo (52) is mounted below the rotary valve (48). The second silo (52) has a cylindrical wall (54) provided with a plurality of protrusions (56) extending outwardly from its outer surface. The inner surface (58) of the second silo (52) provides a smooth passage for particles received through the valve (48), enabling their downward discharge toward collection.

A bag holder (60) is removably mounted to the second silo (52). The bag holder (60) includes an annular sidewall (62) having a plurality of slots (64) spaced circumferentially therearound. The slots (64) are dimensioned sized to provide rotatable engagement with the protrusions (56) on the second silo (52) in a quick-release coupling arrangement, enabling rapid installation or removal of the bag holder (60) without tools. A collection bag (66) is secured to the bag holder (60), allowing for convenient accumulation and disposal of the separated particulate matter (36).

The blower assembly (68) is utilized to transfer the air stream (14) containing particulate matter from the shredding machine (12) into the chamber inlet (32). As shown in FIG. 1, the blower assembly (68) may be mounted within the shredding machine (12) and is constructed to deliver a high-velocity air flow sufficient to convey particles having a nominal size of 2 mm×2 mm or less.

During operation, the blower (68) introduces the air stream (14) into the chamber inlet (32), generating the tangential vortex (34). The vortex (34) forms a descending outer spiral (70) of particle-laden air moving along the housing sidewall (22) and an ascending inner spiral (72) of cleaned air that exits through the top outlet (40). This counterflow action promotes efficient centrifugal separation. The air velocity and centrifugal force are dimensioned to remove at least 90% of particles larger than 5 microns before discharge through the top outlet (40).

The separated heavier particles descend into the first silo (44), pass through the rotary valve (48), and enter the second silo (52), ultimately collecting in the removable bag (66) for easy disposal. The HEPA filter (42) ensures that remaining fine dust particles are captured, thereby reducing airborne contamination and improving environmental safety.

The separator system is mounted on a frame (80) having a horizontal support bracket (82) to support the assembly. Front and rear access covers (84, 86) conceal the rotary valve (48) and provide an ascetically pleasing configuration for commercial environments while providing ease of access for valve servicing. A ramp (90) is positioned at the bottom of the frame and can be adjusted for various inclines. The upper surface (92) of the ramp (90) provides support for the collection bag (66) providing a visual indicator for the amount of material within the bag, wherein a filled bag can be easily detected by an enlarged bulge caused by the ramp incline.

All patents mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is adapted to carry out the objectives and obtain the ends and advantages mentioned, as well as those inherent therein. The embodiments described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A centrifugal separator system for separating particulate matter received from an adjoining shredder machine, comprising:

a frame;

a housing mounted to the frame having a cylindrical sidewall defining an interior chamber, said interior chamber having a conical shape decreasing in diameter from a top wall to a bottom aperture;

a chamber inlet positioned tangentially relative to said sidewall juxtapositioned to said top wall, and constructed to introduce an airstream from an industrial shredding machine into said chamber in a tangential direction to create a vortex flow, said vortex flow causing centrifugal separation of particles from the air, wherein heavier particles are displaced radially outward toward said sidewall and slide downward along said sidewall through a discharge outlet;

a top outlet centrally located in said top wall for discharge of air substantially free of particles larger than a few microns, said discharge of air directed through a HEPA filter;

a first silo coupled to a lower edge of said housing, said first silo constructed and arranged to decelerate said separated particles expelled through said discharge outlet;

a rotary valve coupled to said first silo and configured to act as an airlock between zones to maintain pressure levels;

a second silo coupled to a lower end of said rotary valve, said second silo having a plurality of protrusions along an outer surface, and an inner surface to allow passage of particles received through said rotary valve;

a bag holder having side wall including a plurality of slots for releasably securing to said plurality of protrusions; and a collection bag securable to said bag holder;

a blower to transfer particles from said adjoining shredder machine to said chamber inlet; and a ramp constructed and arranged to support the collection bag;

wherein said collection bag is available for ease of disposal of large particles and said HEPA filter is available to captures smaller particles namely dust.

2. The centrifugal separator system of claim 1, wherein said blower is mounted in the adjoining shredder machine and is constructed and arranged to provide a flow of air carrying particles having a size of 2 mm×2 mm or less.

3. The centrifugal separator system of claim 1, wherein said vortex flow forms a descending spiral of air along said housing sidewall and an ascending inner vortex of cleaned air exiting through said top outlet.

4. The centrifugal separator system of claim 1, wherein said first silo has a conical lower section to direct particles toward the rotary valve with reduced air turbulence.

5. The centrifugal separator system of claim 1, wherein said protrusions provide a quick-release coupling wherein said bag holder has slots rotatably engaging said protrusions for mounting or removing said bag holder from said second silo.

6. The centrifugal separator system of claim 1, wherein said system is dimensioned such that the air velocity and centrifugal force are sufficient to remove at least 90% of particles larger than 5 microns prior to discharge through the top outlet pipe.

* * * * *